R. MONTAGUE.
MACHINE FOR MAKING BUTTER.
APPLICATION FILED APR. 14, 1910.
966,574.
Patented Aug. 9, 1910.
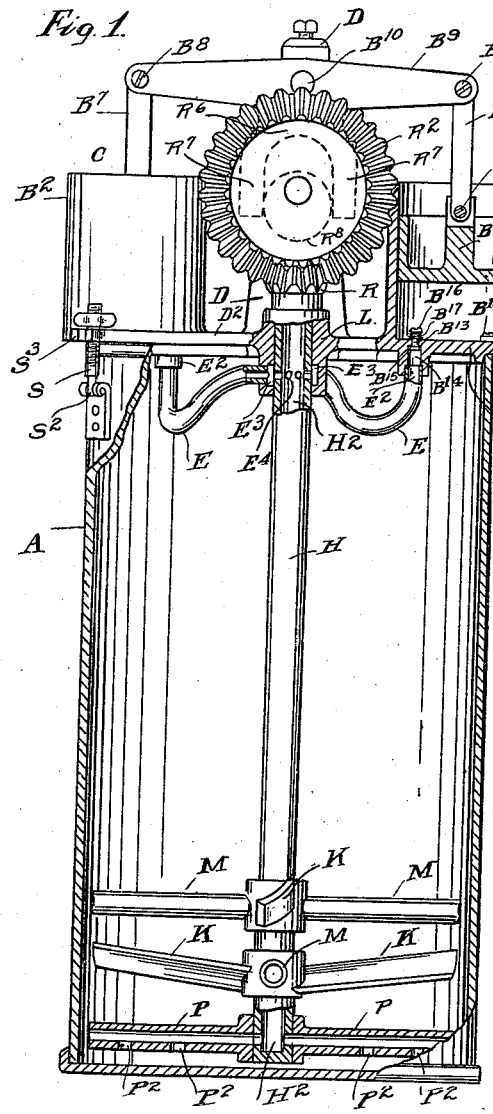
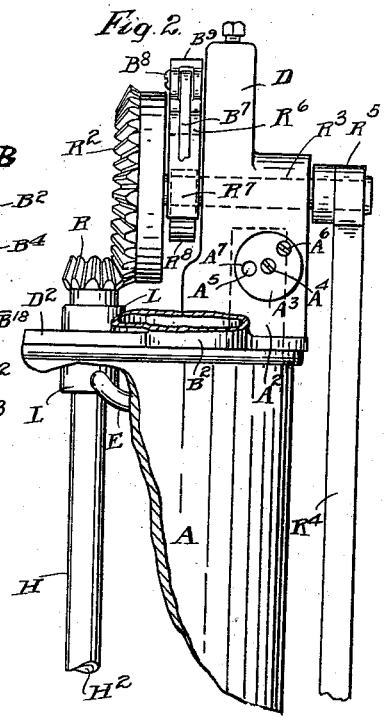
Witnesses
Newton Allen
K. Smith.
Inventor
Rodney Montague
by Alfred M. Allen
Attorney

UNITED STATES PATENT OFFICE.

RODNEY MONTAGUE, OF CINCINNATI, OHIO, ASSIGNOR TO P. C. BERTRAM, OF CINCINNATI, OHIO.

MACHINE FOR MAKING BUTTER.

966,574.  Specification of Letters Patent.  Patented Aug. 9, 1910.

Original application filed January 2, 1909, Serial No. 470,444. Divided and this application filed April 14, 1910. Serial No. 555,392.

*To all whom it may concern:*

Be it known that I, RODNEY MONTAGUE, a citizen of the United States, and a resident of the city of Cincinnati, in the county of Hamilton and State of Ohio, have invented certain new and useful Improvements in Machines for Making Butter, of which the following is a full, clear, and exact description, reference being had to the accompanying drawing, forming a part of this specification.

One of the principal objects of my invention is to separate out the butter fats from the milk constituents without rupturing the membraneous sacs containing the fat globules.

Heretofore the process of butter making has comprised a violent agitation of the milk or cream for the purpose of, and which has invariably resulted in the breaking up of the fat cells to cause the fat to coalesce. I have discovered, however, contrary to the accepted theories, that by a separation of the fat globules unruptured and at the same time by permeating the fat globules with air, a perfect butter is produced, which will not become rancid when exposed to the air and the ordinary atmospheric conditions, and which will remain pure and sweet for many days. The fat is protected by the membrane of the cell walls from the ordinary chemical or fermentative changes, and consequently without resorting to preservative means, the original freshness and purity of the butter remains unchanged for many days and even weeks, and at temperatures little short of the melting point. Of course heat will disrupt the cells and the fat will coalesce as in ordinary rendering processes, and at times at temperatures less than the melting point the cells break down and the butter becomes subject to its ordinary unstable characteristics. But under my process, the fermentative and chemical change remains abortive for long periods. In addition to this, not only can the butter be produced by my novel process in from one to three minutes under any and all conditions, but a very much larger per cent. of butter can be obtained from a given amount of milk or cream than by any of the well known processes of churning.

My invention in the present instance relates to certain novel apparatus for effecting this separation of the fat globules without rupturing and for permeating the product with air, and it consists of that certain novel construction and arrangement of parts to be hereinafter particularly pointed out and claimed, and in which the several features of my invention and the various advantages resulting from their use conjointly or otherwise will be apparent from the following description and claims.

The present application relates to the machine designed for carrying out the process set forth in an application heretofore filed on January 2nd, 1909, bearing the Serial Number 470,444, for the process, and of which original application this application is a division.

In the drawings, Figure 1 is a central vertical section of my preferred machine, partly in elevation. Fig. 2 is an elevation of the upper half of the right hand side of the machine as shown in Fig. 1, the parts of the apparatus being broken away.

A indicates a cylinder of any desired size: that is to say, its capacity may be varied, as the size of the barrel of a churn may be varied from a capacity for holding a pint or a quart to a capacity of many gallons. This cylinder may be made of any suitable material. So it can be made of wood, or of any kind of metal, strong enough to retain the cylindrical shape. This cylinder may be lined when desired with any proper lining, among which may be mentioned porcelain, tin, glass or fancy lining. Covering this cylinder and extending into it is the mechanism of my invention, and of one of the forms whereby my improved process can be carried into effect.

I provide two pumps,—a pump B, and a pump C, for forcing air. These pumps B and C may be of any desired pattern. In the present illustrative instance, each of them is constructed as follows: $B^2$ is the outer cylindrical shell of the pump having a bottom $B^3$. In each pump is a reciprocatory piston $B^4$. To the central portion $B^5$ of this piston is connected the lower end of a connecting rod $B^7$ by a pivot $B^6$. The other end of this rod $B^7$ is connected by a pivot $B^8$ to the adjacent end of a walking beam $B^9$. This beam or oscillating lever $B^9$ is centrally pivoted, that is, fulcrumed at $B^{10}$ to a vertical portion D of the frame of this machine. The bottom $B^3$ of this pump B is provided with an inlet valve $B^{18}$, hinged at $B^{19}$ to the said bottom $B^3$ of the pump. This valve $B^{18}$ communicates directly with the outside atmosphere and draws its supply of air from such air and outside of cylinder A. An outlet valve $B^{14}$ for permitting the air in the pump to be forced out is present in the bottom of the pump. The seat $B^{15}$ of this valve seats against the under side of the bottom $B^3$ of the pump. This valve $B^{14}$ has means for elastically returning it to its seat automatically whenever the diminution of the pressure of air in the pumps permits. The preferred means for this purpose consists of the head $B^{16}$ and a spring $B^{17}$ located between the bottom $B^3$ of the pump B and this head $B^{16}$. When this spring is a coiled one, as shown in the drawing, it may embrace the shank $B^{13}$ of the valve. The valve $B^{14}$ communicates at the enlargement $E^2$ of the bottom $B^3$ of the pump with a pipe E which furnishes the conduit for the air forced by the said pump into the hollow shaft H. Around this hollow shaft H is an annular chamber $E^3$. The adjacent end of the conduit E communicates directly with this chamber $E^3$. The other pump C heretofore alluded to, is preferably constructed exactly like the pump B. Its piston $B^7$ is pivoted to that end of the walking beam $B^9$ which is opposite the end where the piston $B^7$ of pump $B^3$ is pivoted. The valves of the pump C are like those of pump B. The valve $B^{14}$ of the pump C at the enlargement $E^2$ of the bottom of this pump communicates with a pipe E which communicates with the annular chamber $E^3$. The hollow shaft H is provided with a series of perforations $E^4$ extending from the annular chamber $E^3$ to the space $H^2$ within the hollow shaft. This hollow shaft H carries lower down on it radial paddles K, and radial air discharging tubes M and radial air discharging tubes P. The faces of each paddle are inclined at an angle to the horizontal, substantially as shown, and the radial air discharging tubes M communicate with the interior space $H^2$ of the hollow shaft H. Likewise the air passage of each of the discharging tubes P connects with said air space $H^2$ of shaft H. These air discharging tubes P each has downwardly extending openings $P^2$ that discharge a portion of the air passing through them (the said tubes) in a downward direction. This shaft H is journaled in a suitable bearing L fixed in the frame $D^2$. The shaft H is duly rotatable. A convenient means for this purpose is as follows: A beveled pinion R is fixed on the upper end of the shaft H and above the bearing L. $R^2$ is a beveled gear wheel that meshes with the beveled pinion R. This gear wheel $R^2$ is mounted on a shaft $R^3$ journaled in the frame D of the machine. The shaft $R^3$ is rotatable by any kind of power desired. In the present instance, a crank lever $R^4$ fixed to the shaft $R^3$ at $R^5$ is employed, and a portion of such crank $R^4$ is shown.

Means for admitting air to the cylinder A in a way entirely independent of the pump inlets aforementioned is provided in the machine illustrated in the drawing and consists as follows: A conduit or pipe $A^2$ extends from the cylinder A upward from its upper end and may be said to constitute an air dome. In this dome is an orifice $A^5$. A disk $A^3$ has a passageway $A^7$ through it. This disk is pivoted at $A^4$ and has a set screw $A^6$. By rotating this disk $A^3$, the passageway $A^7$ can be made to coincide and aline more or less as desired with the passageway $A^5$ of the dome or pipe $A^2$. When these ways $A^5$ and $A^7$ fully coincide, the orifice can admit the fullest amount of air possible. As the disk $A^3$ is rotated, the passage $A^7$ gets more and more out of alinement with the passage $A^5$ and the orifice of admittance to the pipe $A^2$ is correspondingly diminished until it is altogether cut off. The set crew $A^6$ affords a convenient means of setting the disk $A^3$ in the position it should have to properly regulate the quantity of air admitted by the disk $A^3$ through the orifices $A^7$ and $A^5$ to the pipe $A^2$.

The operation of my machine is as follows: The cylinder A is partially filled with the cream which is to be converted into butter. The shaft H is now rapidly rotated and the pumps operated simultaneously. The air discharged from the pumps is forced into this hollow shaft H, and thence it is forced down through this shaft H and passes through the tubes M and out from the outer free ends into the cylinder A. The air passing down through the shaft H is also driven out through the tubes P, and consequently issues from the free ends of these tubes and also downward through the passageways or perforations $P^2$. Consequently the air issuing from the ends of the tubes M strikes the side of the churn or cylinder A, and the air issuing from the ends of the tubes P strikes the side of the cylinder A. The air passing down through the passageways $P^2$ strikes the bottom of the cylinder A. The air thus striking the side of the cylinder A rebounds, and the air thus striking the bottom of the cylinder rebounds. As it rebounds from the side of the cylinder and as it rebounds from the bottom of the cylinder, it bounds back into the cream, and is carried with it in its swift revolutions. In this way, it is to be especially noted that the air does not directly strike the cream, for if it did, it would be liable to bruise or break the sacs containing butter fats, and thus to a large extent destroy the value and the sweetness of the butter, but by striking the bottom and side of the churn and bounding back into the cream, it affiliates with the cream, without bruising or breaking the globules.

Any desired and well known means may be present to enable the power applied to rotate the hollow shaft H and what it carries to also oscillate the walking beam B⁹. The illustrated means for this purpose are a yoke R⁶, having forked arms R⁷, R⁷. This yoke is fixed to the oscillating beam B⁹. Between the arms R⁷, R⁷, is an eccentric R⁸, fixed on shaft R³. As the shaft R³ is rotated in the manner aforesaid, the eccentric R⁸ moves the arms R⁷, R⁷, alternately to the right and to the left. This oscillation of the arms R⁷, R⁷, operates to alternately elevate and depress the respective ends of the walking beam.

It is to be observed that the terminal portions of the tubes M and P approach very near to the side of the cylinder; also that the lower tubes P also revolve in a plane very close to the bottom of the cylinder.

The cover of the cylinder A is removable, and when the upper mechanism is located upon said cover, this mechanism is temporarily removed from the cover. When in position, this cover fits closely upon the top of the cylinder A. It is held down by suitable means; for instance, the hook S, pivoted at S², and when the cover is held down, hooked into the eye S³ attached to the frame D².

In the foregoing specification, and in the claims thereof, wherever the word cream occurs, it is to be understood as standing for any liquid capable of being churned, as for example, for sweet cream, sour cream, sweet milk, or sour milk, etc.

Having thus described my invention, what I claim as new and desire to secure by Letters Patent, is:

1. In a machine for making butter, a closed cylindrical vessel, having a central rotatable hollow shaft, with a series of air tubes radially projecting from the lower end of said shaft, and extending to the wall of the vessel, the lowermost air tubes having openings throughout their length opening downwardly to project the air against the bottom of the vessel and the uppermost tubes having openings at their outer ends to project the air against the side wall of the vessel, an air pump for forcing air through said shaft and air tubes and means for rotating said shaft and air tubes.

2. In a machine for making butter, a closed cylindrical vessel, having a central rotatable shaft, with air tubes radially projecting from the lower end of said shaft and extending to the wall of the vessel, with openings at the outer ends of said tubes to project the air against the side wall, an air pump for forcing air through said shaft and air tubes, means for admitting air into said cylinder independent of the pump inlets, and means for rotating said shaft and air tubes.

3. In a machine for making butter, a closed cylinder having a central rotatable hollow shaft, provided with paddles for agitating the material, and with air tubes projecting from this shaft and discharging the air close to and against the walls of the cylinder, the lowest tubes being close to the bottom of the cylinder, and having terminal holes, and also transverse air passages opening downward for discharging air against the bottom of the cylinder, pumping devices for forcing air through the shaft, with means for rotating the shaft.

RODNEY MONTAGUE.

Attest:
J. L. LOGAN,
G. W. WELCH.